United States Patent
Medvinsky

(10) Patent No.: US 6,754,908 B1
(45) Date of Patent: Jun. 22, 2004

(54) INTRUSION DETECTION FOR OBJECT SECURITY

(75) Inventor: Alexander Medvinsky, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/505,336

(22) Filed: Feb. 16, 2000

Related U.S. Application Data

(60) Provisional application No. 60/173,962, filed on Dec. 30, 1999, and provisional application No. 60/165,090, filed on Nov. 12, 1999.

(51) Int. Cl.$^7$ .............................................. H04N 7/173
(52) U.S. Cl. ........................................ 725/107; 725/25
(58) Field of Search .............................. 725/16, 25, 31, 725/107, 114, 116, 131, 139, 146, 152, 140, 132; 380/2; 713/187, 194, 200; 702/119

(56) References Cited

U.S. PATENT DOCUMENTS

| | | | |
|---|---|---|---|
| 4,599,646 A | * 7/1986 | Cottam | 380/207 |
| 4,712,239 A | * 12/1987 | Frezza et al. | 725/31 |
| 5,005,200 A | 4/1991 | Fischer | 380/30 |
| 5,125,028 A | * 6/1992 | Naito | 380/223 |
| 5,388,212 A | * 2/1995 | Grube et al. | 713/200 |
| 5,420,923 A | * 5/1995 | Beyers et al. | 380/234 |
| 5,483,658 A | * 1/1996 | Grube et al. | 713/200 |
| 5,844,986 A | 12/1998 | Davis | 380/4 |
| 5,912,972 A | 6/1999 | Barton | 380/23 |
| 5,933,498 A | 8/1999 | Schneck et al. | |
| 5,961,644 A | * 10/1999 | Kurtzberg et al. | 713/200 |
| 5,982,890 A | * 11/1999 | Akatsu | 713/200 |
| 5,982,891 A | 11/1999 | Ginter et al. | 380/4 |
| 6,119,172 A | * 9/2000 | Belmont et al. | 709/250 |
| 6,256,393 B1 | * 7/2001 | Safadi et al. | 380/232 |
| 6,314,409 B2 | 11/2001 | Schneck et al. | |
| 6,389,538 B1 | * 5/2002 | Gruse et al. | 713/194 |

FOREIGN PATENT DOCUMENTS

| | | | |
|---|---|---|---|
| EP | 0 752 786 A1 | 1/1997 | H04N/7/167 |
| EP | 0 909 094 A1 | 4/1999 | H04N/7/173 |
| EP | 0 914 001 A1 | 5/1999 | H04N/7/16 |
| EP | 0 936 813 A1 | 8/1999 | H04N/7/00 |
| EP | 0 946 019 A1 | 9/1999 | H04L/9/32 |
| WO | WO 98/55910 | 12/1998 | G06F/1/00 |
| WO | WO 98/56180 | 12/1998 | H04N/7/167 |
| WO | WO 99/09743 | 2/1999 | H04N/7/167 |
| WO | WO 99/30217 | 6/1999 | G06F/1/00 |
| WO | WO 99/39504 | 8/1999 | H04N/7/167 |
| WO | WO 99/53624 | 10/1999 | H04B/1/69 |
| WO | WO 00/04727 | 1/2000 | H04N/7/24 |

OTHER PUBLICATIONS

"Bullet Buster", [online] [retrieved on May 14, 2003] Retrieved from the Internet Archive (WayBack Machine) using Internet <URL: http://web.archive.org/web/19981203121755/www.hackerscatalog.com/bullet.htm>.*

Olin Sibert et al., "Digibox: A Self–Protecting Container for Information Commerce," Proceedings of the First USENIX Workshop on Electronic Commerce, New York, Jul. 1995.

(List continued on next page.)

Primary Examiner—John Miller
Assistant Examiner—Scott Beliveau
(74) Attorney, Agent, or Firm—Townsend and Townsend and Crew LLP

(57) ABSTRACT

According to the invention, an apparatus and methods for detecting modifications to information within a content receiver are described. In one embodiment, a method for detecting modification to a content receiver within a conditional access system is disclosed. In this process, a content provider generates a message. The message is sent to the content receiver by way of a network. The content receiver gets the message from the network. The content provider detects any unauthorized modification to the content receiver.

12 Claims, 7 Drawing Sheets

OTHER PUBLICATIONS

InterTrust Technologies Corporation, "A Piece of the Tick. Supporting the Commercial Redistribution of Electronic Information through Value Chains," Oct. 1998.

"Digital Consumer Electronics Handbook," McGraw–Hill, 1997, pp. 17.18–17.25.

"SentinelSuperPro," Rainbow Technologies. Retrieved from the Internet: http://sentinel.rainbow.com, pp. 1–2.

"iKey," Rainbow Technologies. Retrieved from the Internet: http://ikey.rainbow.com, pp. 1–2.

Monica Pawlan et al., "Signed Applets, Browsers, and File Access." Retrieved from the Internet: http://developer.java.sun.com/developer/technicalArticles/Security/Signed/index.html, Apr. 1998.

Monica Pawlan, "Cryptography: The Ancient Art of Secret Messages." Retrieved from the Internet: http://developer.java.sun.com/developer/technicalArticles/Security/Crypto/index.html, Feb. 1998.

Monica Pawlan, "Is the Only Really Secure Computer a Disconnected Computer?" Retrieved from the Internet: http://developer.java.sun.com/developer/technicalArticles/Security/ReallySecure/index.html, Jan. 1998.

Microsoft Corporation, "Microsoft Authenticode Technology. Ensuring Accountability and Authenticity for Software Components on the Internet," Redmond, VA, Oct. 1996.

"Modern Cable Television Technology: Video, Voice, and Data Communications," Morgan Kaufmann Publishers, Inc., San Francisco, CA, 1999, pp. 743–751.

Dan S. Wallach et al., "Extensible Security Architectures for Java," BNS Document ID XP–002101681, 1997, pp. 1–26.

Charles Crichton et al., "When to trust mobile objects: access control in the Jini™ Software System," BNS Document ID XP–002155686, 1999. pp. 116–125.

Hackenberg, Gerald, *Computerviren: Vorbeugung und Bekampfung*, 258 IT Informationstechnik, 32 (1990) Februar. No. 1, Siemens AG, Munchen.

English translation of above Cite No. BC.

Schneck, Paul B., *Persistent Access Control to Prevent Piracy of Digital Information,* Proceedings of the IEEE, vol. 87, No. 7, Jul. 1999, pp. 1239–1250.

* cited by examiner though every set top box may receive the match. Once a subscriber orders the pay per view program, an entitlement message is broadcast in encrypted form to all set top boxes. Only the particular set top box the entitlement message is intended for can decrypt it. Inside the decrypted entitlement message is a key that will decrypt the pay per view program. With that key, the set top box decrypts the pay per view program as it is received in real-time.

INTRUSION DETECTION FOR OBJECT SECURITY

This application claims the benefit of U.S. Provisional Application No. 60/165,090 filed on Nov. 12, 1999 and U.S. Provisional Application No. 60/173,962 field on Dec. 30, 1999.

CROSS-REFERENCES TO RELATED APPLICATIONS

This application is related U.S. patent application Ser. No. 09/493,984, entitled "Object Security Implementation" filed on Jan. 28, 2000, which is incorporated herein by reference.

BACKGROUND OF THE INVENTION

This invention relates in general to conditional access systems and, more specifically, to detecting modifications to information within a content receiver.

Cable television (TV) providers distribute video streams to subscribers by way of conditional access (CA) systems. CA systems distribute video streams from a headend of the cable TV provider to a set top box associated with a subscriber. The headend includes hardware that receives the video streams and distributes them to the set top boxes within the CA system. Select set top boxes are allowed to decode certain video streams according to entitlement information sent by the cable TV provider to the set top box. In a similar way, other video program providers use satellite dishes to wirelessly distribute video content to set top boxes.

Video programs are broadcast to all set top boxes, but only a subset of those boxes are given access to specific video programs. For example, only those that have ordered a pay per view boxing match are allowed to view it even though every set top box may receive the match. Once a subscriber orders the pay per view program, an entitlement message is broadcast in encrypted form to all set top boxes. Only the particular set top box the entitlement message is intended for can decrypt it. Inside the decrypted entitlement message is a key that will decrypt the pay per view program. With that key, the set top box decrypts the pay per view program as it is received in real-time.

The set top boxes are located remotely from cable TV provider and are susceptible to hacking by pirates attempting to steal content. As those skilled in the art appreciate, set top boxes incorporate elaborate security mechanisms to thwart the efforts of pirates. However, these security mechanisms are occasionally circumvented by pirates who hack the set top boxes. Accordingly, methods for remotely detecting modification to the security mechanisms are desired.

SUMMARY OF THE INVENTION

According to the invention, disclosed are an apparatus and methods for detecting modifications to information within a content receiver. In one embodiment, a method for detecting modification to a content receiver within a conditional access system is disclosed. In this process, a content provider generates a message. The message is sent to the content receiver by way of a network. The content receiver gets the message from the network. The content provider detects any unauthorized modification to the content receiver.

In another embodiment, a process for detecting modification to a content receiver within a conditional access system is disclosed. In one portion of the process, a content provider generates a message that intentionally includes an error. The message is sent to a content receiver by way of a network. At some point, the content receiver accepts the message from the network. An exception condition is recorded if the content receiver fails to notify the content provider of the error in the message.

In yet another embodiment, a method for detecting modification to a content receiver within a conditional access system is described. As part of this process, a content provider generates a message. The message is sent to a content receiver by way of a network. At some point, the content receiver accepts the message from the network. Detecting failure of the content receiver to check at least one of authentication of the message and authorization of the message.

DESCRIPTION OF THE SPECIFIC EMBODIMENTS

The present invention validates information, such as software, has not been modified within a television set top box. In one embodiment, a message is periodically sent to the set top box that purposefully contains errors. A validation routine in the set top box should report those errors back to a cable television (TV) provider. However, the validation routine may not report these errors if it has been modified or replaced by hackers, for example. Accordingly, the cable TV provider can determine if the security routine is no longer functional by noting the absence of an error report.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Figure 1:
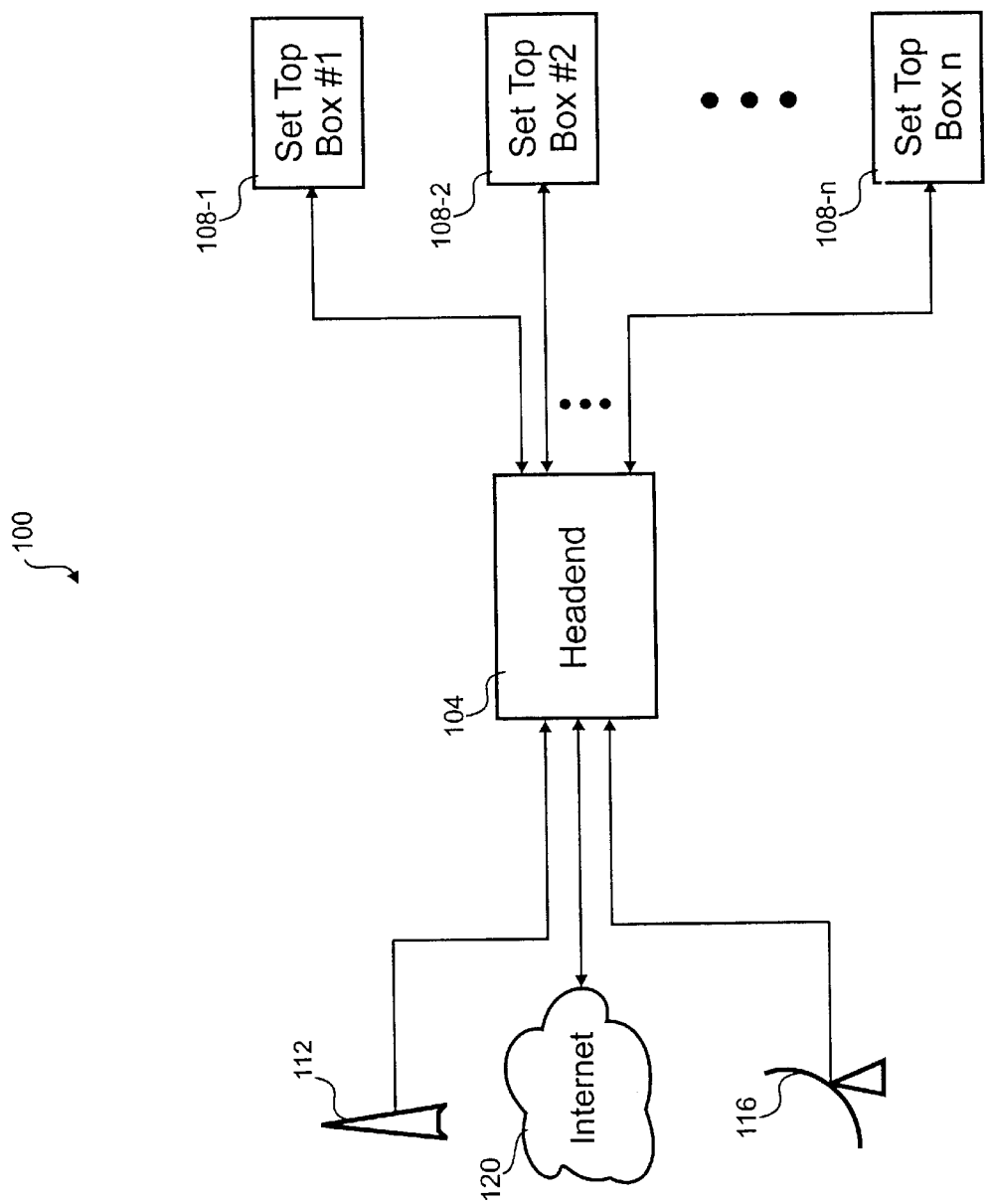
FIG. 1 is a block diagram showing one embodiment of a content delivery system.

Referring first to FIG. 1, a block diagram of one embodiment of a content delivery system 100 is shown. The delivery system 100 selectively provides content to a number of users based upon certain conditions being satisfied. Included in the system 100 are a headend 104, number of set top boxes 108, local programming receiver 112, satellite dish 116, and the Internet 120.

The headend 104 receives content and distributes that content to users. Content can include video, audio, interactive video, software, firmware, and/or data. This content is received from a variety of sources that include the satellite dish 116, local programming receiver 112, microwave receivers, packet switched networks, Internet 120, etc. Each set top box 108 has a unique address that allows sending entitlement information to an individual set top box 108. In this way, one set top box 108-1 can entitle a particular content while another 108-2 cannot. Equipment within the headend 104 regulates which set top boxes 108 are entitled to which content.

The content is generally distributed in digital form through an analog carrier channel that contains multiple content streams. All the content streams are statistically multiplexed together into a digital stream that is modulated upon the analog carrier channel. The separate content streams are separated by packet identification (PID) information such that the individual content streams can be removed according to their unique PID information. There are around one hundred and twenty analog carrier channels in this embodiment of the system 100. Other embodiments could distribute the content with satellite dishes, microwave antennas, RF transmitters, packet switched networks, cellular data modems, carrier current, or phone lines.

Figure 2:
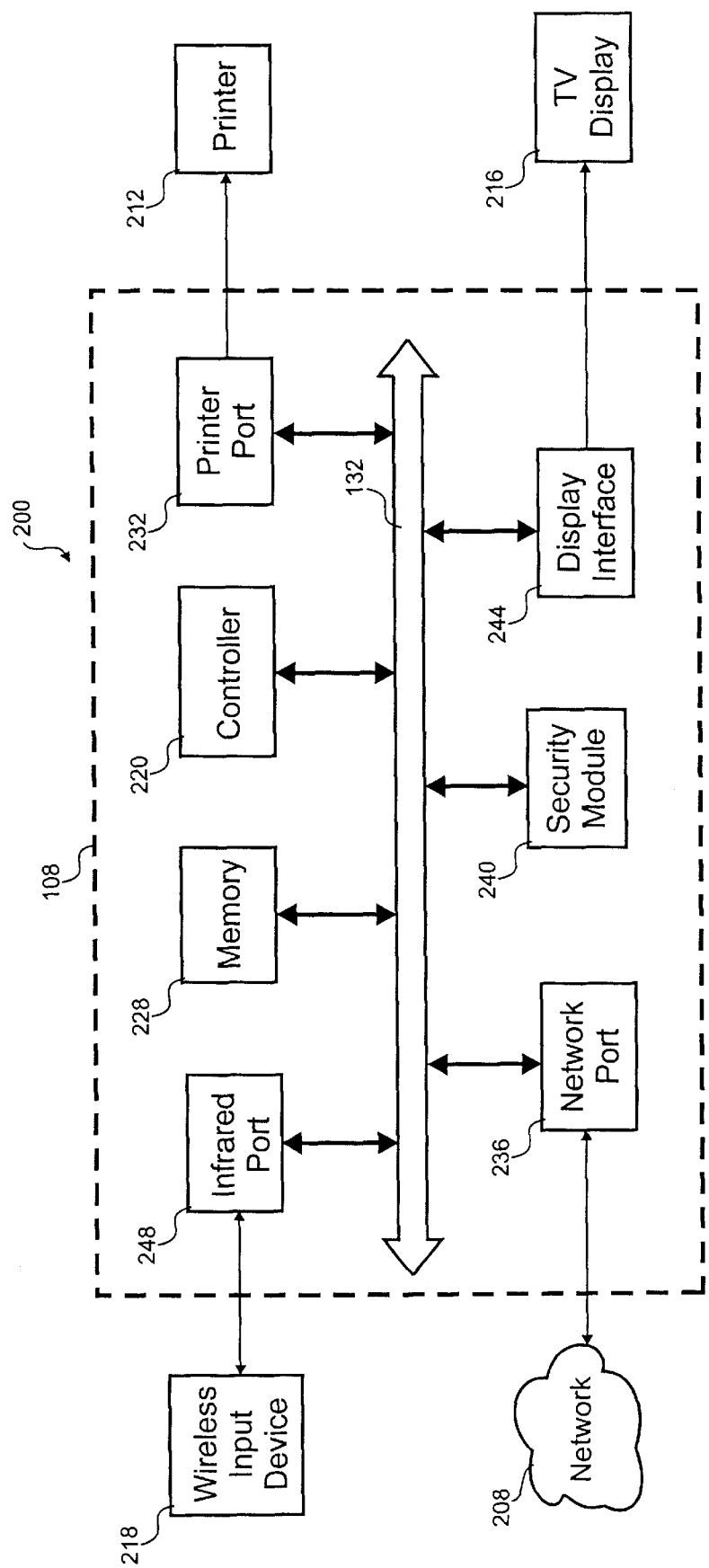
FIG. 2 is a block diagram illustrating an embodiment of a set top box interfaced to its environment.

Referring next to FIG. 2, a block diagram of an embodiment of a display system 200 is shown. This embodiment provides multiple levels of object and resource security through various security mechanisms. Included in the display system 200 are a set top box 108, network 208, printer 212, TV display 216, and wireless input device 218. These items cooperate in such a way that the user can enjoy content provided from a content provider. The content can be video, audio, software, firmware, interactive TV, data, or other information. In this embodiment, the content provider is a cable TV provider.

The network 208 serves as the conduit for information traveling between the set top box 108 and the headend 104 of the cable TV provider. In this embodiment, the network has one hundred and twenty analog channels and a bi-directional control data channel. Generally, the analog channels carry content and the control data channel carries control and entitlement information. Each analog carrier channel has a number of digital channels statistically multiplexed into one data stream where the digital channels are distinguished by packet identifiers (PIDs). The bi-directional control channel is an out-of-band channel that broadcasts data to the set top boxes 108 at one frequency and receives data from the boxes 108 at another frequency. Return data may be queued to decrease overloading during peak use periods using a store and forward methodology well known in the art. Other embodiments could use a cable modem for both control information and content where the content is formatted as packet switched data.

The printer 212 is an optional accessory some users may purchase and add to their display system 200. When using the set top box 108 for personal computer tasks, the printer 212 allows printing data such as email, web pages, billing information, etc. As will be explained further below, the ability to use a peripheral like a printer is regulated by an authorization check. Using the regulation feature, printers 212 compatible with the set top box 108 do not work unless proper authorization is obtained.

The TV display 216 presents the user with audio and/or video corresponding to the content. The display 216 typically receives an analog video signal that is modulated on a carrier corresponding to channel three, channel four or a composite channel. The set top box 108 produces a NTSC signal, for example, modulated to the appropriate channel. Other embodiments could use a video monitor or digital display instead of a television display 216. Use of a digital display would alleviate the need for an analog conversion by the set top box 108 because digital displays, such as liquid crystal displays, use digital information to formulate the displayed picture.

The wireless input device 218 allows interaction between the user and the set top box 108. This device 218 could be a remote control, mouse, keyboard, game controller, pen tablet or other input mechanism. An infrared transceiver on the input device 218 communicates with a similar transceiver on the set top box 108 to allow wireless communication. In other embodiments, RF link or wired link could be used instead of the infrared transceiver.

The set top box 108 has component parts that perform authentication and authorization of objects and resources. Objects are information such as software, drivers, firmware, data, video, or audio. Resources are anything needed by an object to operate as intended such as another object or a physical device. Included in the set top box 108 are a controller 220, memory 228, a printer port 232, a network port 236, a security module 240, a display interface 244, and an infrared (IR) port 248. These blocks communicate with each other over a bus 132 where each block has a different address to uniquely identify it on the bus 132.

The controller 220 manages operation of the set top box 108 using a trusted or secure operating system. Such functions as decryption and decompression are performed in the controller 220 as well as functions such as switching TV channels for the user and presenting menus to the user. Included in the controller are a processor, an encryption engine, local memory, and other items common in computing systems.

The set top box 108 includes a block of memory 228 for data and program storage and program execution. This memory 228 is solid state memory that could include RAM, ROM, flash, and other types of volatile and non-volatile memory. During execution, programs are loaded from the memory 228 and use the memory 228 for scratchpad space. Keys, serial numbers and authorizations can be non-volatilely stored in flash memory.

This embodiment includes a printer port 232 for interfacing to an optional printer 212. The printer port 232 resource is not available to programs unless authorized. As explained further below, each object must have authorization to use a resource such as the printer port 232. Data is sent from the printer port 232 to the printer 212 in a serial or parallel fashion by way of a wired or wireless transport mechanism.

A checkpoint is encountered when printing is requested. The checkpoint authorizes and authenticates the object requesting the printing. Checkpoints are places in an object where authentication and/or authorization are run on that object or another object. Ideally, checkpoints are performed when the purpose of the object becomes manifest. In the case of a printer port 232, its purpose becomes manifest when it is used to print something. Accordingly, a checkpoint is triggered to check the object using the printer port 232 resource when anything is printed.

The network port 236 allows bi-directional communication between the set top box 108 and the headend 104. Included in the network port 236 are a tuner and a demodulator that tune to analog carrier channels and demodulate an MPEG data stream to allow one-way delivery of content. Also included in the network port 236 are a control data transceiver or cable modem that allows for bi-directional communication of control data information and/or content. To distribute loading of the control data path to the headend 104 more evenly, a store and forward methodology may be used.

Modulating of the digital video signal onto an analog signal compatible with the TV display 216 is performed by the display interface 244. As discussed above, the TV display 216 generally accepts signals modulated on channel three, channel four or a composite channel. For displays that accept a digital input, such as LCD displays, the display interface 244 performs any formatting required by the digital input.

The IR port 248 communicates bi-directionally with a wireless input device 218. Included in the IR port 248 is an IR transceiver that provides the wireless communication path with the input device 218. Other electronics in the IR port 248 convert analog signals received by the transceiver to a corresponding digital signal and convert analog signals sent to the transceiver from a corresponding digital signal. The controller 220 processed the digital signals so that the user can control some of the functions within the set top box 108.

The security module 240 regulates security functions within the set top box 108. For example, the security module 240 performs authentication and authorization either under the direction of the controller 220 or independent of the controller 220 as will become clear in the discussion below. To perform its tasks, the security module 240 includes a processor, RAM and ROM that cooperate to execute software independent of the controller 220. The security module 240 also includes a decryption engine and a hash function for deciphering content and calculating signatures. As can be appreciated, a pirate may be able to hack the software in either the controller 220 or the security module 240 to make it appear that authentication and authorization were performed and that particular results were achieved.

Figure 3:
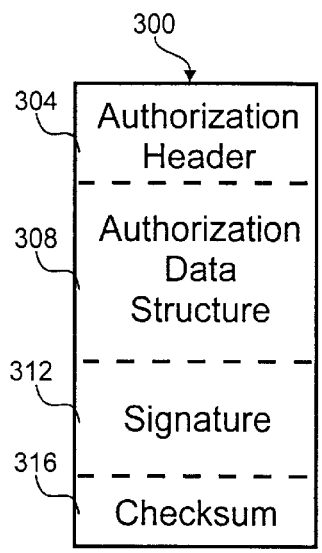
FIG. 3 is a block diagram depicting an embodiment of an authorization message.
Figure 4:
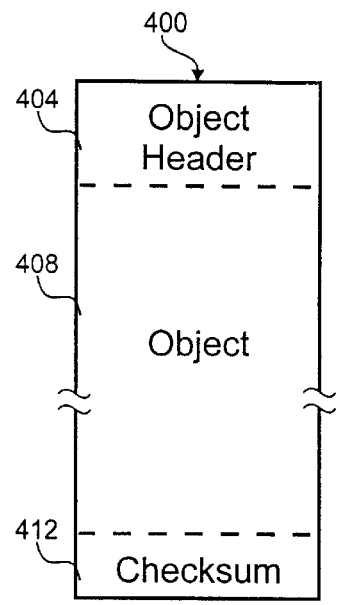
FIG. 4 is a block diagram showing an embodiment of an object message.
Figure 5:
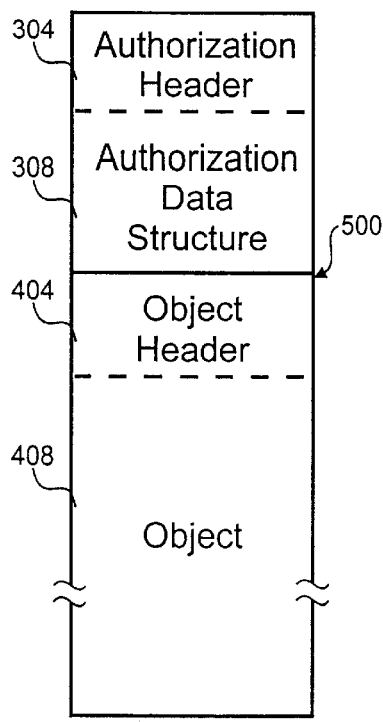
FIG. 5 is a block diagram illustrating an embodiment of a signatory group that includes portions of the authorization and object messages.

With reference to FIGS. 3–5, an authorization message 300, an object message 400 and a signatory group 500 are respectively shown in block diagram form. Included in the authorization message 300 of FIG. 3 are an authorization header 304, an authorization data structure 308, a signature 312, and a first checksum 316. The authorization message 300 has information used to both authenticate and authorize the object message 400. Forming the object message of FIG. 4 are an object header 404, an object 408 and a second checksum 412. The object message 400 serves as the transport for the object 408. The signatory group 500 includes components of the authorization message 300 and object message 400 arranged end-to-end. The signature 312 is calculated over the whole signatory group 500. More specifically, the signatory group 500 of FIG. 5 includes the authorization header 304, authorization data structure 308, object header 404, and object 408.

The authorization header 304 indicates the configuration of the authorization message 300. Included in the header 304 are a subtype identifier and a message version. The subtype identifier distinguishes the various types of authorization messages 300 from one another. In this embodiment, there are authorization message subtypes corresponding to objects and resources. Object subtypes have a corresponding object message 400, but resource subtypes do not. Accordingly, the subtype identifier is used to determine if there is an object message 400 associated with an authorization message 300. There may be several types of object subtypes and resource subtypes for a given system and the message version allows distinguishing the various types.

The authorization data structure 308 provides authorization information to the set top box 108. In the case of an authorization message subtype corresponding to an object, the authorization data structure 308 contains an object identifier, a software version, cost information, entitlement information, lifetime information, and one or more program tiers. The object identifier is unique for each object 408 and allows attributing an authorization message 300 to its corresponding object message 400. Version information is included in the data structure 308 to indicate the version of the object 408.

Portions of the authorization data structure 308 are used to determine availability of the object 408 to the set top box 108. The cost information indicates to the set top box 108, and sometimes the user, the price associated with the object 408. Entitlement information is used to determine if the particular set top box 108 is authorized to accept the object 408. The entitlement information may include a key if the object 408 is encrypted with a symmetric key. If the set top box 108 is not authorized for the object, there is no need to process the corresponding object 408 when it is received. Lifetime information allows expiring of the authorization of the object 408 to prevent use after a certain date or time. Programming tiers are used to restrict authorization of objects 408 to predefined tiers such that a set top box 108 can only access objects 408 within a predetermined tier.

The signature 312 is used to verify that portions of both the authorization message 300 and corresponding software message 400 are authentic. A hash function such as SHA-1 or MD5 is run over the whole signatory group, whereafter the result is run through a signing algorithm such as RSA, ECC and DSA to produce the signature. Alternatively, a simple CRC algorithm could be used for the hash function, whereafter the result could be sent through an encryption algorithm such as or triple-DES and DES to produce the signature. When compiling the authorization message 300, the headend 104 calculates the signature 312 over the whole signatory group 500 before inserting the signature 312 into the authorization message 300. The set top box 108 calculates the signature of the signatory group 500 upon receipt of both the authorization and software messages 300, 400. Once the signature is calculated, it is checked against the received signature to authenticate portions of both the authorization and software messages 300, 400. If the signatures do not match, the set top box 108 discards the software message 400 because it presumably came from an improper source.

The first and second checksums 316, 412 are calculated with either linear or non-linear algorithms. These checksums 316, 412 verify the integrity of the data as it is transported to the set top box 108 over the network 208. For example, the checksum could be a cyclic redundancy check (CRC) which performs a binary addition without carry for each byte in the message. A message spooler application calculates the checksum 316 as the message 300 is being sent and appends the checksum 316 onto the end of the message 300. Conversely, the set top box 108 calculates the checksum as the message 300 is received and checks the calculated checksum against the checksum 316 in the received message 300. If the calculated and received checksums do not match, an error in transmission has occurred. Messages 300, 400 with errors are discarded whereafter the headend 104 may send replacement messages 300, 400.

The object header 404 includes attributes for the object message 400. Included in the object header 404 are a header length, an object length, the object identifier, the software version, and a domain identifier. The header and object lengths respectively indicate the lengths of the object header 404 and the object 408. As described above, the object identifier provides a unique code that allows attributing the authorization message 300 to the object message 400. The software version indicates the version of the object. Different cable TV providers are assigned domain identifiers such that all of the set top boxes 108, which might receive an object 408, can screen for objects 408 associated with their domain.

The object 408 includes content the system 100 is designed to deliver to set top boxes 108. Several types of information can be embedded in an object, such as executable programs, firmware upgrades, run-time programs (e.g., JAVA® or ACTIVEX®), programming schedules, billing information, video, audio, or data. The object 408 can be used immediately after authentication and authorization or at a later time. Additionally, authorization can be programmed to expire after a certain amount of time.

Referring specifically to FIG. 5, the signatory group 500 is shown. This group 500 is comprised of parts of both the authorization message 300 and the object message 400. All the data used to calculate the signature 312 is included in the signatory group 500. Because the signature requires components from both the authorization message 300 and the object message 400, a failed signature check indicates one of the authorization message 300 and the software message 400 cannot be verified as originating from a trusted source. The trusted source being the cable TV provider that generated the signature 312.

Figure 6:
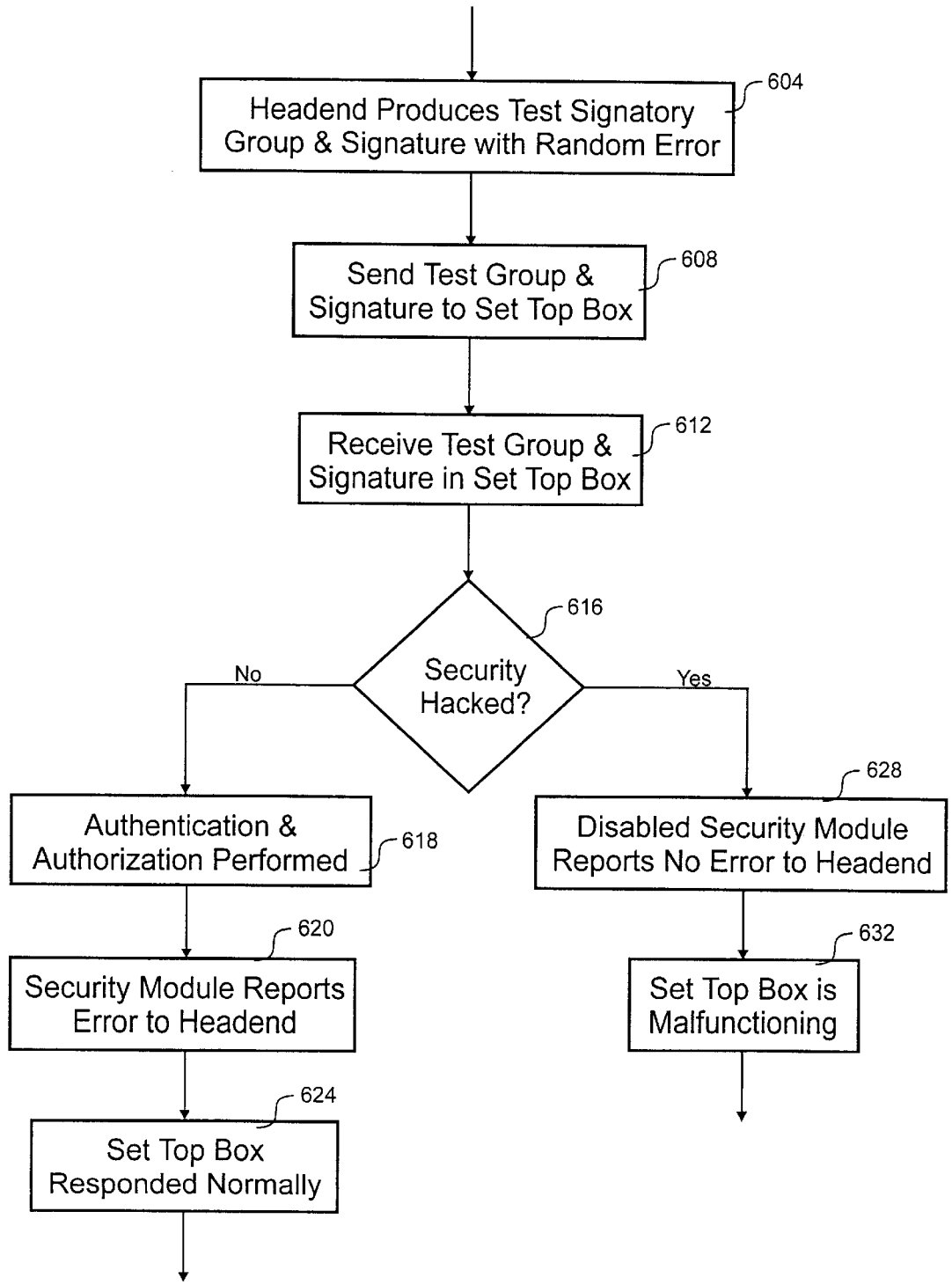
FIG. 6 is a flow diagram showing an embodiment of a process that checks for modification to security functions in the set top box.

Referring next to FIG. 6, an embodiment of a process for testing integrity of the security in a set top box is shown. This process detects modifications to set top box that cause successful authentication of messages with invalid signatures or successful authorization of messages having improper entitlement. By circumventing the authorization checks, a hacked set top box 108 can authorize itself to receive any content broadcast to it. As those skilled in the art can appreciate, a pirate could hack a set top box such that all objects 408 are authenticated and authorized without any checking. Modifying the software in the security module 240 or controller 220 could accomplish this bypass of security. In a hacked system, however, a message that purposefully contains an error would not result in any error being reported back to the headend 104. By detecting this exception condition, hacked set top boxes are detected.

The process beings in step 604 where the headend 104 produces authorization and object messages 300, 400 that collectively include a test signatory group 500 and signature 312. At least one of the test signatory group 500 and signature 312 intentionally includes an error. The error could be one or more incorrect bits placed anywhere in the test signatory group 500 or the signature 312. In step 608, the messages 300, 400 are sent to the set top box 108. Unless intending to test the checksum validation routine, the first and second checksums 316, 412 are correctly calculated on the erroneous messages 300, 400 and appended to the messages 300, 400. The set top box 108 receives the messages 300, 400 in step 612.

The processing in step 616 depends on whether the authentication and authorization routines are hacked such that they always report that the messages 300, 400 pass authentication and authorization. If the set top box 108 security functions have not been hacked, processing continues to steps 618, 620 and 624 where normal processing is performed. In step 618, the security module 240 performs authentication and authorization. Since the messages 300, 400 include at least one intentional error, authentication fails. As part of normal operation, authentication and authorization errors are reported back to the headend 104 in step 620. In step 624, the headend 104 receives the error, which is the expected response. Accordingly, no exception condition is reported for the unhacked set top box 108.

If the authentication and authorization checks are disabled by a pirate, virus or other problems, the security module 240 reports no error to the headend 104 in step 628. After no error is received by the headend 104 in step 632, an exception condition is recorded by the content provider. To disable the malfunctioning set top box 108, future entitlements and authorizations are not addressed to the set top box 108. Additionally, efforts could be made to retrieve the hacked set top box 108 and apprehend the pirate.

Figure 7:
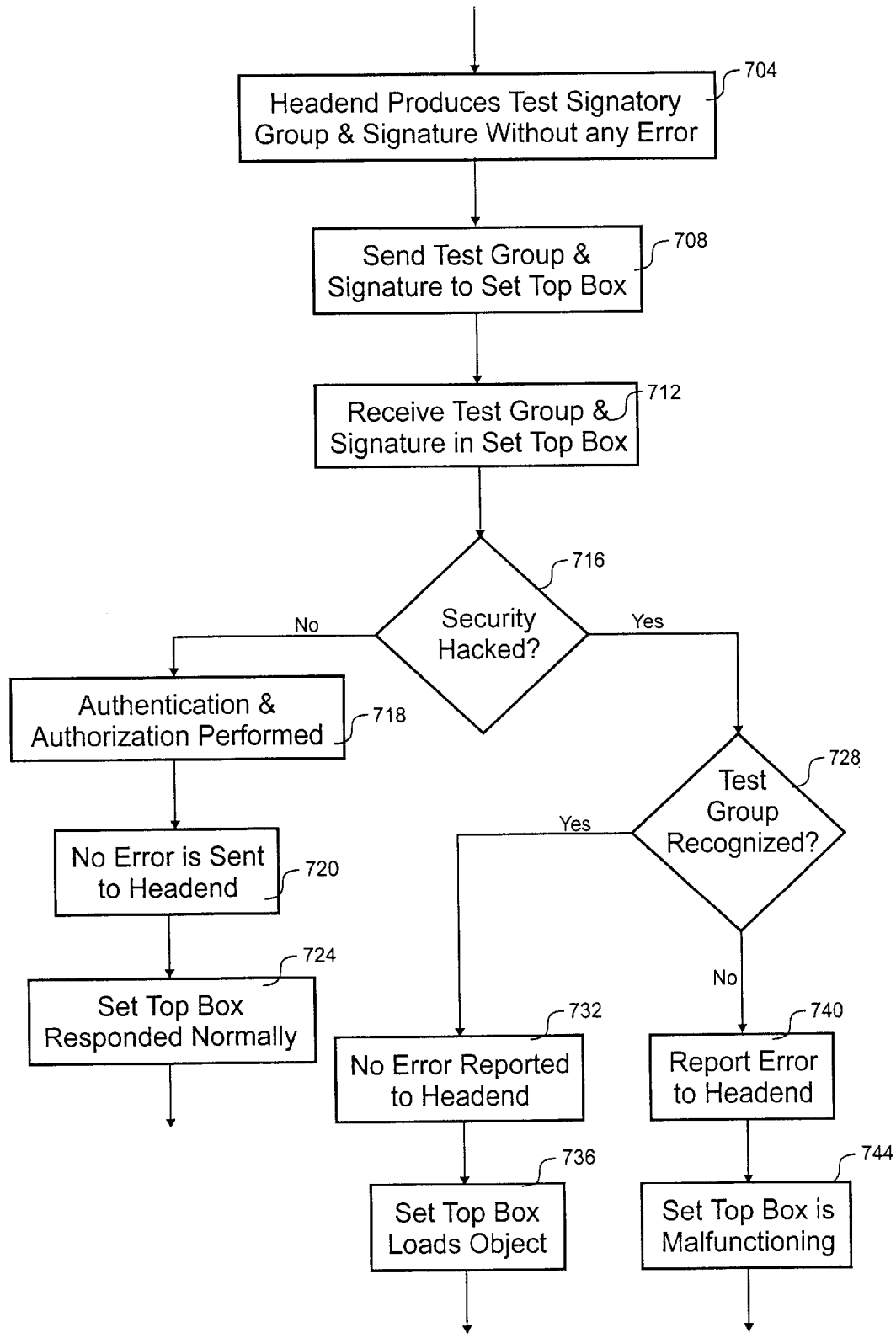
FIG. 7 is a flow diagram depicting another embodiment of a process that checks for modification to the security functions.

With reference to FIG. 7, another embodiment of a process for detecting modifications to the security functions of the set top box 108 is shown. This embodiment protects against a hacked set top box that responds to known objects 408 with no error and responds to unknown objects 408 with an error. The hacked set top box in this embodiment is modified to recognize certain signatory groups by recording a list of their signatures 312 or otherwise fingerprinting the objects. These desired signatures are gathered from other set top boxes or various surreptitious means.

The process begins in step 704 where the headend 104 randomly prepares authorization and object messages 300, 400 without any errors. These messages 300, 400 have no functional purpose and would not appear on the list of fingerprints maintained by the pirate. The messages 300, 400 are randomly generated such that they cannot be recognized by the hacked set top box. Additionally, the test groups are sent at random times and appear similar to normal objects 408. In step 708, the messages 300, 400 are sent to the set top box 108. The set top box 108 receive the messages 300, 400 in step 712.

Processing after this point depends on whether the security mechanisms have been circumvented. If there is no modification to the security features, authentication and authorization is performed in step 718 without finding errors. Since no error in the test signatory group is found in step 718, no error is reported to the headend 104 in step 720. The headend 104 notes that the set top box 108 is behaving normally in step 724.

Alternatively, processing continues from step 716 to step 728 if the security features are hacked to recognize some signatory groups while rejecting all others. In step 728, the hacked software in the set top box 108 refers to the list of objects 408 to recognize. If the object 408 is recognized, processing continues to step 732 where no error is reported to the headend 104. Next, the set top box 108 loads the object in step 736. However, in this example the object 408 is not likely to be recognized because the messages 300, 400 are randomly generated such that recognition is extremely rare.

When the object 408 is not recognized, an error is reported to the headend 104 in step 740. The error message includes the unique identifier of the set top box 108, error type and status information. By reporting this error when none should have occurred, the headend 104 generates an exception condition in step 744. At this point, the headend 104 believes the set top box 108 is malfunctioning. After further tests, the content provider could take steps to stop operation of the malfunctioning set top box 108.

Figure 8:
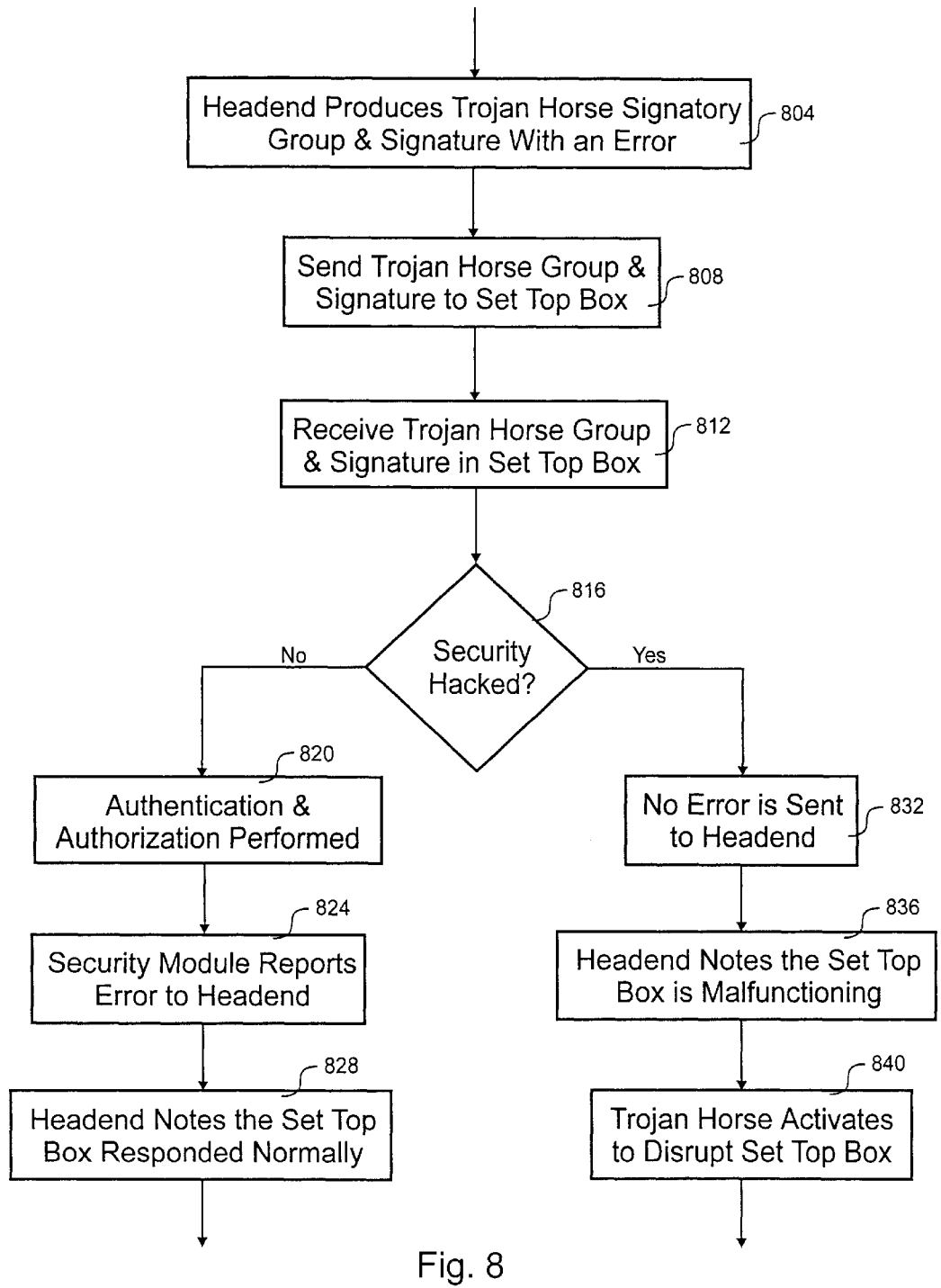
FIG. 8 is a flow diagram showing an embodiment of a process that activates a trojan horse if the security functions are malfunctioning.

Referring next to FIG. 8, an embodiment of a process that uses a trojan horse mechanism to disrupt service on a hacked set top box 108 is shown. The trojan horse mechanism activates if it detects normal authentication and authorization are not performed. Once activated, a message is output to the TV display 216 that disrupts normal program viewing.

Processing begins in step 804 where the headend 104 produces a trojan horse signatory group 500 and signature 312 that intentionally includes an error. This error does not interfere with the operation of the trojan horse object 408. The trojan horse mechanism can be embedded in a normal application so that it appears as unobtrusive as possible. For example, the normal e-mail application object could have the trojan horse code embedded within, but disabled. The introduced error could change a single bit value that would activate the trojan horse code in the e-mail application. By testing for the predetermined error, the e-mail application knows when to activate the trojan horse code and when not to. Accordingly, the activated trojan horse object differs from the normal e-mail object by only one bit.

The trojan horse messages 300, 400 are sent to the set top box 108 in step 808 and received by the set top box 108 in step 812. Further processing depends on whether the security features have been disabled such that authentication and authorization are not performed. If the security features have not been disabled or hacked 816, processing continues to step 820 where authentication and authorization are performed in the normal manner. Since the trojan horse messages 300, 400 include the intentional error, authentication and/or authorization will fail. Failure of these checks results in removal of the trojan horse object 408 from memory. In step 824, the security module 240 reports the error to the headend 104. Since an error is expected, the content provider notes the unmodified set top box 108 is behaving normally. The email application without the error is distributed periodically, and only during occasional testing includes the error.

In contrast, a hacked set top box 108 determined in step 816 behaves differently from the unmodified set top box 108. No authentication or authorizations run on the hacked set top box 108. Accordingly, no error is recognized in the trojan horse signatory group and no error is reported back to the headend 104 in step 832. After receiving no error message, the content provider notes an exception condition for the hacked set top box 108 in step 836.

The security module 240 is normally involved in authentication and authorization. Additionally, running of authentication and authorization can be sensed by software in the set top box 108. Sensing that authentication and authorization has not been performed, the trojan horse in the object activates and disrupts operation of the set top box 108 in step 840. The disruption could be displaying a message on the TV display 216 or otherwise disabling functionality of the set top box 108.

Although the embodiment of FIG. 8 senses the running of authentication and authorization to determine when the set top box 108 has been hacked, other embodiments could make this determination in different ways. In a preferred embodiment, an error is embedded into at least one of the signatory group 500 or signature 312 such that authentication should always fail and cause the trojan horse object 408 to not be loaded. A hacked set top box 108 might ignore failures in authentication and run the object 408 anyway. Within the trojan horse object 408 are disruptive routines that disable functions within the set top box 108. Accordingly, the mere fact that the trojan horse object 408 loads is indicia that the authentication routine is disabled.

In yet another embodiment, the trojan horse object 408 shadows the security module 240 when performing some of the security functions such as authentication and authorization. In other words, the trojan horse object 408 duplicates the authentication and authorization to verify proper operation of the security module 240. If the trojan horse object 408 detects the security module 240 is broken in some way by verifying some of the functionality of the module 240, the trojan horse functionality activates to disrupt use of the set top box 108.

In a preferred embodiment, authorization could be tested by use of an invalid authorization. For example, a random authorization tier or level is assigned to the trojan horse object 408 that is know to be invalid by the delivery system 100. Since the authorization tier is invalid, no set top box 108 should be authorized to load the trojan horse object 408. If the trojan horse object 408 is loaded despite the invalid authorization tier, the object 408 disrupts operation of the set top box 108.

As those skilled in the art can appreciate, a hacked set top box 108 could monitor the authorization tiers normally used in an attempt to determine the invalid authorization tiers. Once the supposedly invalid authorization tiers are known, objects associated with previously unused authorization tier are not loaded because they are presumably trojan horse objects 408. To circumvent this hack by the pirate, the random authorization tier used by a trojan horse object 408 for the first time could later be used as a valid authorization tier that corresponded to normal objects 408. Accordingly, the pirate could not reject all objects 408 associated with a new authorization tier without loosing normal objects 408.

In a further refinement, a test object is assigned to the new authorization tier and broadcast to the set top boxes 108. Since the random authorization tier has become a valid authorization tier, normal set top boxes execute the test object, however, hacked set top boxes reject the test object 408 merely because it belongs to the random authorization tier. In the normal set top box, the test object monitors interrogates the set top box 108 and reports status back to the headend 104. In contrast, the hacked set top box rejects the test object, which cannot load and report back status. The absence of status to the headend 104 indicates to the headend 104 that the set top box 108 is broken. Once the headend 104 is aware of the exception condition, the broken set top box is flagged such that appropriate action may be taken.

Figure 9:
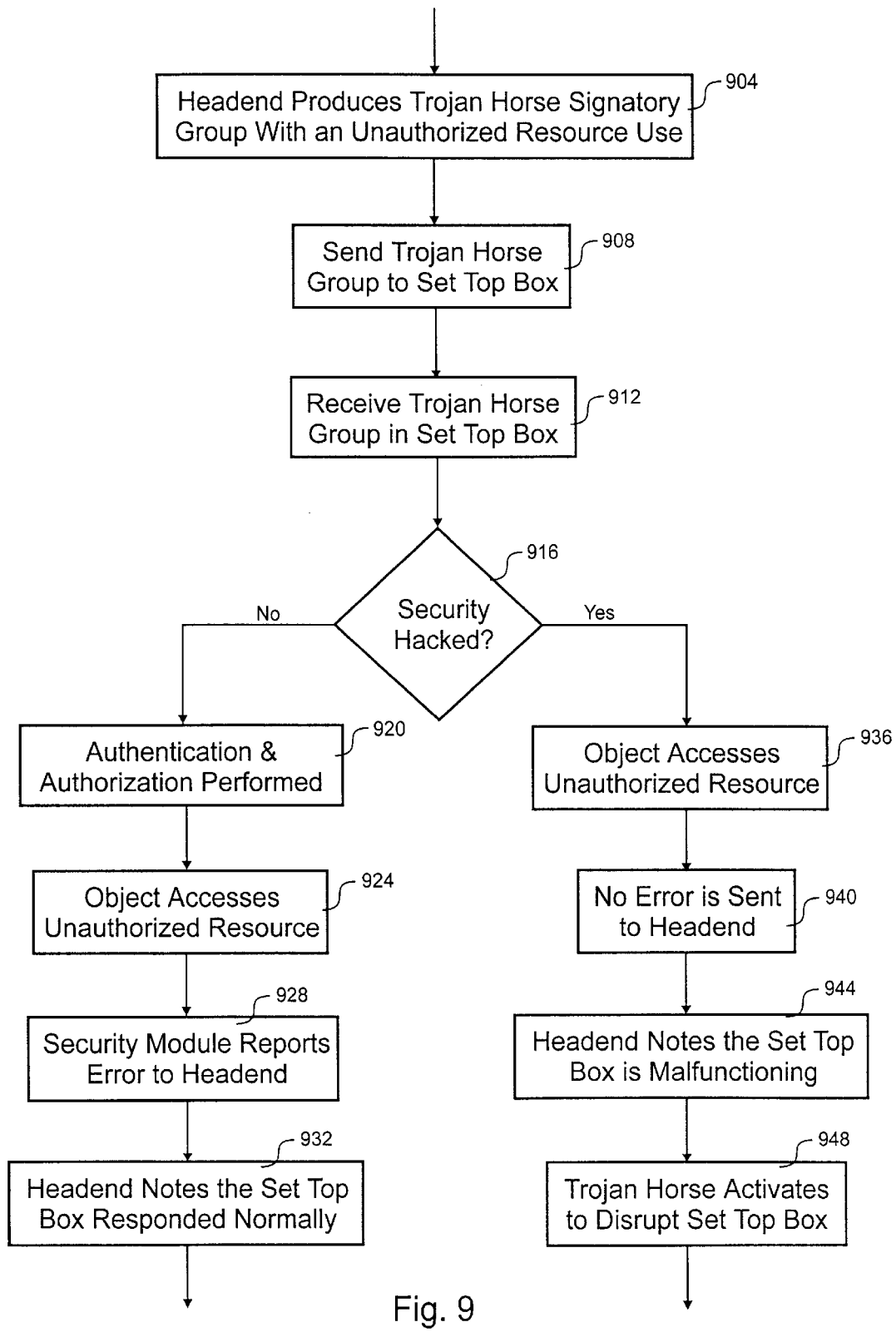
FIG. 9 is a flow diagram showing another embodiment of a process that activates a trojan horse if the security functions are malfunctioning.

With reference to FIG. 9, another embodiment of a process that uses a trojan horse mechanism to disrupt service on a hacked set top box 108 is shown. This embodiment tests for set top boxes 108 that have disabled resource authorization mechanisms. Objects 408 are authorized to interact with predetermined resources as defined in the authorization data structure 308. Upon access of a resource by an object 408, the authorization to use that resource is checked during normal operation of the set top box 108. Any unauthorized access is reported back to the headend 104.

The process begins in step 904 where the content provider produces a trojan horse signatory group 500 and signature 312 in the headend 104. Included in the trojan horse signatory group 500 is an object 408 that purposefully accesses a resource that is not allowed by the authorization data structure 308 of the object 408. The trojan horse signatory group 500 is sent by the headend 104 in step 908 and is received by the set top box in step 912. Further processing depends on whether the security features have been disabled such that authorization is not performed as determined in step 916.

If the security features are functioning normally, processing continues from step 916 to step 920 where authentication and authorization are performed on the trojan horse messages 300, 400. After loading the object 408, it attempts to access an unauthorized resource in step 924. The error in authorization is noticed in step 928 and the security module 240 notifies the headend 104 of the error. As a result of the authorization failure, the object 408 is unloaded from memory 228. Unloading the object 408 from memory 228 prevents the subsequent disruptive functions of the object 228. Upon receiving the error message, the headend 104 notes in step 932 that the set top box 108 responded normally.

Alternatively, a hacked set top box 108 does not check authorization. In step 936, the object 408 freely accesses the resource even though unauthorized. Accordingly, no error is sent to the headend 104 in step 940. When the headend 104 notices no error is received, an exception condition is noted in step 944 that signifies the set top box 108 is malfunctioning. Since the trojan horse object 408 was allowed to stay in memory 228 and continue execution, the trojan horse object 408 in step 948 disrupts the functionality of the set top box 108. In this way authorization to use resources is verified by the content provider.

The embodiment of FIG. 9 is effective where a trojan horse object is designed for the unique address and authorizations for each set top box 108. As those skilled in the art appreciate, different set top boxes 108 can have different authorizations for their resources. To trap the exception condition in the manner described in relation to FIG. 9, the content provider picks a resource that is not already authorized for a particular set top box 108.

In a system 100 where the trojan horse objects are not uniquely formulated and addressed to each set top box, a single trojan horse object is broadcast for use by a number of boxes. In this embodiment, the system 100 broadcasts a test object prior to broadcast of the trojan horse object. The test object serves as the unauthorized resource the trojan horse object attempts to access. In this way, knowledge of which resources are authorized in each set top box 108 is unnecessary.

To prevent detection of the unauthorized resource such that a hacked set top box could respond with an error whenever the unauthorized resource is accessed, the unauthorized resource is eventually authorized. Once authorized, a test object is broadcast to the set top boxes 108 to access the now authorized resource. Unmodified set top boxes 108 allow the access without error. A hacked set top box, however, would respond with an error because of the false assumption that the resource is still unauthorized. This error of the hacked set top box generates an exception condition that signals the hacked set top box is compromised.

In light of the above description, a number of advantages of the present invention are readily apparent. The cable TV provider detects malfunctions in the set top box that affect normal operation of the security mechanisms. Additionally, signatory groups can contain trojan horse programs that disrupt operation of malfunctioning set top boxes such that a pirate cannot view content in a normal way.

A number of variations and modifications of the invention can also be used. For example, the set top box may not be a separate unit, but could be integrated into the television or other audio vision equipment. Although the embodiment described in relation to FIG. 9 couples a trojan horse program with a test of unauthorized resource accesses, other embodiments could test unauthorized resource accesses without a trojan horse program. The failure of detecting the unauthorized resource access would be reported back to the headend for resolution.

Although the invention is described with reference to specific embodiments thereof, the embodiments are merely illustrative, and not limiting, of the invention, the scope of which is to be determined solely by the appended claims.

What is claimed is:

1. A method for detecting modification to a content receiver within a conditional access system, the method comprising steps of:

generating a message by a content provider of the conditional access system;

sending the message to a content receiver by way of a network;

receiving the message by the content receiver from the network; and loading a portion of the message that disrupts operation of the content receiver if the content receiver fails to check at least one of authentication of the message and authorization of the message.

2. The method for detecting modification to a content receiver within a conditional access system of claim 1, further comprising a step of verifying the validity of the message as it passes from the content provider to the content receiver.

3. The method for detecting modification to a content receiver within a conditional access system of claim 1, further comprising a step of recording an exception condition if the content receiver notifies the content provider of an error in the message.

4. The method for detecting modification to a content receiver within a conditional access system of claim 1, further comprising a step of detecting if the content receiver fails to report interacting with an unauthorized resource proscribed by the message.

5. The method for detecting modification to a content receiver within a conditional access system of claim 1, further comprising steps of:

checking authenticity of the message, and checking authorization of the message.

6. A method for detecting modification to a content receiver within a conditional access system after a content receiver is deployed in a broadcast television system, the method comprising steps of:

generating a message with a content provider couple to the conditional access system;

sending the message with a content receiver by way of a content ditrbution network wherein:

the message includes an intentionally inserted error, and the content receiver is deployed in the coditional access system for receving content that includes video programs;

receiving the message by the content receiver from the content destribution network, checking authenticity of the message;

cheking authorazation of the messge; and automatically detecting, at a point remote to the content receiver, that the content receiver failed to detect the intentionally-inserted error in the message.

7. A method for detecting modification to a content receiver within a conditional access system after a content receiver is deployed in a broadcast television system, the method comprising steps of:

generating a message with a content provider couple to the conditional access system;

sending the message with a content receiver by way of a content ditribution network wherein:
- the message includes an intentionally inserted error, and
- the content receiver is deployed in the coditional access system for receving content that includes video programs;

receiving the message by the content receiver from the content destribution network; and automatically detecting, at a point remote to the content receiver, that the content receiver failed to detect the intentionally-inserted error in the message wherein the content receiver is a set top box.

8. The method for detecting modification to a content receiver within a conditional access system after the content receiver is deployed in the broadcast television system of claim 6, further comprising a step of reporting an exception condition if the content receiver fails to report an error in response to either of the checking steps.

9. The method for detecting modification to a content receiver within a conditional access system after the content receiver is deployed in the broadcast television system of claim 6, further comprising a step of reporting an exception condition if the content receiver reports an error in response to either of the checking steps.

10. The method for detecting modification to a content receiver within a conditional access system after a content receiver is deployed in a broadcast television system, the method comprising steps of:

generating a message with a content provider coupled to the conditional access system;

sending the message to the content receiver by way of a content distribution network wherein:
- the message includes an intentionally-inserted error, and
- the content receiver is deployed in the conditional access system for receiving content that includes video programs;

receiving the message by the content receiver from the content distribution network;

automatically detecting, at a point remote to the content receiver, that the content receiver failed to detect the intentionally-inserted error in the message; and randomly placing an error in the message.

11. The method for detecting modification to a content receiver within a conditional access system after a content receiver is deployed in a broadcast television system, the method comprising steps of:

generating a message with a content provider coupled to the conditional access system;

sending the message to the content receiver by way of a content distribution network wherein:
- the message includes an intentionally-inserted error, and
- the content receiver is deployed in the conditional access system for receiving content that includes video programs;

receiving the message by the content receiver from the content distribution network;

automatically detecting, at a point remote to the content receiver, that the content receiver failed to detect the intentionally-inserted error in the message;

detecting if the content receiver fails to check at least one of authentication of the message and authorization of the message; and loading a portion of the message that disrupts operation of the content receiver.

12. A method for detecting modification to a content receiver within a conditional access system after a content receiver is deployed in a broadcast television system, the method comprising steps of:

generating a message with a content provider coupled to the conditional access system;

sending the message to the content receiver by way of a content distribution network wherein:
- the message includes an intentionally-inserted error, and
- the content receiver is deployed in the conditional access system for receiving content that includes video programs;

receiving the message by the content receiver from the content distribution network;

automatically detecting, at a point remote to the content receiver, that the content receiver failed to detect the intentionally-inserted error in the message;

interacting with an unauthorized resource;

detecting if the content receiver fails to report the interacting step; and loading a portion of the message that disrupts operation of the content receiver without intervention from outside the content receiver.

* * * * *

UNITED STATES PATENT AND TRADEMARK OFFICE
CERTIFICATE OF CORRECTION

PATENT NO. : 6,754,908 B1
DATED : June 22, 2004
INVENTOR(S) : Alexander Medvinsky It is certified that error appears in the above-identified patent and that said Letters Patent is hereby corrected as shown below:

Column 12,
Line 47, after "generating a message with a content provider" delete "couple" and insert -- coupled --
Line 49, after "sending the message" delete "with a content receiver" and insert -- to the content receiver --
Line 50, after "by way of a content" delete "ditribution" and insert -- distribution --
Line 51, after "the message includes an" delete "intentionally inserted" and insert -- intentionally-inserted --
Line 53, after "the content receiver is deployed in the" delete "coditional access system for receiving" and insert -- conditional access system for receiving --
Line 56, after "receiving the message by the content receiver from the content" delete "destribution network" and insert -- distribution network --
Line 60, after "checking authenticity of the message;" delete "checking authorazation of the message;" and insert -- checking authorization of the message; --

Column 13,
Line 28, after "10." delete "A" and insert -- The --
Line 48, after "11." delete "A" and insert -- The --

Signed and Sealed this

Twenty-first Day of September, 2004

JON W. DUDAS
*Director of the United States Patent and Trademark Office*